United States Patent
Yang

(10) Patent No.: US 6,813,528 B1
(45) Date of Patent: Nov. 2, 2004

(54) APPARATUS AND METHOD FOR OUTPUTTING AUDIO SIGNAL OF LAPTOP COMPUTER COUPLED WITH DOCKING STATION

(75) Inventor: Sung-dong Yang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/264,809

(22) Filed: Mar. 9, 1999

(30) Foreign Application Priority Data

Mar. 9, 1998 (KR) ............................................. 98-7723

(51) Int. Cl.$^7$ .............................................. G06F 17/00
(52) U.S. Cl. ........................ 700/94; 381/306; 381/333
(58) Field of Search ........................... 700/94; 381/306, 381/300, 87, 333, 98, 120

(56) References Cited

U.S. PATENT DOCUMENTS

| | | |
|---|---|---|
| 5,291,556 A | 3/1994 | Gale |
| 5,371,803 A * | 12/1994 | Williamson, III ............ 381/74 |
| 5,448,647 A | 9/1995 | Koizumi |
| 5,604,663 A | 2/1997 | Shin et al. |
| 5,696,814 A | 12/1997 | Tran et al. |
| 5,910,991 A * | 6/1999 | Farrar .......................... 381/59 |
| 6,011,686 A * | 1/2000 | Grasso et al. ................ 361/686 |
| 6,111,960 A * | 8/2000 | Aarts et al. ................... 381/61 |
| 6,148,243 A * | 11/2000 | Ishii et al. ..................... 700/94 |
| 6,233,343 B1 * | 5/2001 | Muranami et al. ............ 381/96 |

* cited by examiner

Primary Examiner—Ping Lee
(74) Attorney, Agent, or Firm—Robert E. Bushnell, Esq.

(57) ABSTRACT

An apparatus and a method for outputting an audio signal of a laptop computer to a first speaker in the laptop computer and a to second speaker in a docking station are provided. The apparatus includes a first controller implemented in the laptop computer for filtering a high frequency band component and a low frequency band component from the audio signal, for mixing the filtered signals, and for outputting the mixed signal to the first speaker when the laptop computer is not coupled with the docking station, and otherwise, filtering only a high frequency band component from the audio signal and outputting the filtered signal to the first speaker. A second controller is implemented in the docking station for receiving the audio signal from the laptop computer, for filtering a low frequency band component from the received audio signal, and for outputting the filtered signal to the second speaker when the laptop computer is coupled with the docking station. When the laptop computer is coupled with the docking station, the audio signal generated in the laptop computer is divided into high and low frequency band signals, and each divided signal is output to different speakers according to the characteristics of the divided signals. Thus, efficiency in use of the speakers and sound quality are improved.

15 Claims, 4 Drawing Sheets

APPARATUS AND METHOD FOR OUTPUTTING AUDIO SIGNAL OF LAPTOP COMPUTER COUPLED WITH DOCKING STATION

CLAIM OF PRIORITY

This application makes reference to, incorporates the same here in, and claims all benefits accruing under 35 U.S.C. § 119 from an application entitled Apparatus For Outputting Audio Signal of Laptop Computer Capable of Being Coupled With Docking Station And Method Therefor earlier filed in the Korean Industrial Property Office on 9 Mar. 1998, and there duly assigned Ser. No. 98-7723 by that Office.

BACKGROUND OF THE INVENTION

1. Field of the Invention

The present invention relates to an apparatus and method for outputting an audio signal of a laptop computer coupled with a docking station, and more particularly, to an apparatus and a method for improving quality of an output audio signal using a system speaker installed in a laptop computer and a speaker of a docking station.

2. Description of the Related Art

Audio systems have been used in the past for outputting audio signals of a laptop computer. Typically, main speakers installed in the computer are used and auxiliary speakers are often used to output audio signals. With these conventional audio systems, all speakers cannot be used efficiently. Furthermore, speakers installed in the computer are useless since the auxiliary speaker system is connected to the laptop computer and audio signals are outputted to auxiliary speakers of the auxiliary system. I have therefore found that it is impossible to correct or otherwise improve the conventional apparatus in order to get a more efficient and useful audio system.

U.S. Pat. No. 5,604,663 for a Portable Computer Docking Station Having a Rotatable Member and Audio Speakers Mounted on the Rotatable Member, issued to Shin et al., discloses a portable computer and a docking station including a base, a rotatable member rotatably attaching to a front side of the base, and an electrical connector. I have noticed that this portable computer with the docking station does not use the speakers efficiently.

U.S. Pat. No. 5,696,814 for a Audio System for a Personal Computer, issued to Tran et al., discloses an audio circuit for driving audio module speakers together or individually and driving only one speaker or a microphone in a speaker phone mode. In my opinion, this reference shows the limited use of speakers in modes for being driven individually or together.

In the above conventional audio signal output circuit, the amplifiers and speakers of the laptop computer are turned off while the docking station is coupled to the laptop computer, thereby lowering efficiency in use. That is, the speakers of the laptop computer or the speakers of the docking station are selectively used. Therefore, quality of an audio signal of a low frequency band or high frequency band is deteriorated.

SUMMARY OF THE INVENTION

It is an object of the present invention to provide an improved audio system for output of an audio signal in a laptop computer and a docking station.

It is another object to provide an audio system with main speakers in the laptop computer and auxiliary speakers in the docking station.

It is yet another object to provide an audio system for outputting an audio signal to speakers of both the computer and the docking station.

It is still another object to provide an audio system for selecting a speaker and an amplifier process in the laptop computer when the computer is coupled to the docking station.

It is still another object to provide an audio system for selecting a speaker and an amplifier process in the docking station when the computer is coupled to the docking station.

It is also an object to provide an audio system for selecting speakers and amplifiers in both the laptop computer and the docking station when the laptop computer is coupled to the docking station.

It is a further object to provide an audio system for outputting an audio signal of a low frequency band component to the amplifier process and the speaker of the docking station.

It is another object to provide an audio system for outputting an audio signal of high frequency band component to the amplifier process and the speakers of the laptop computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
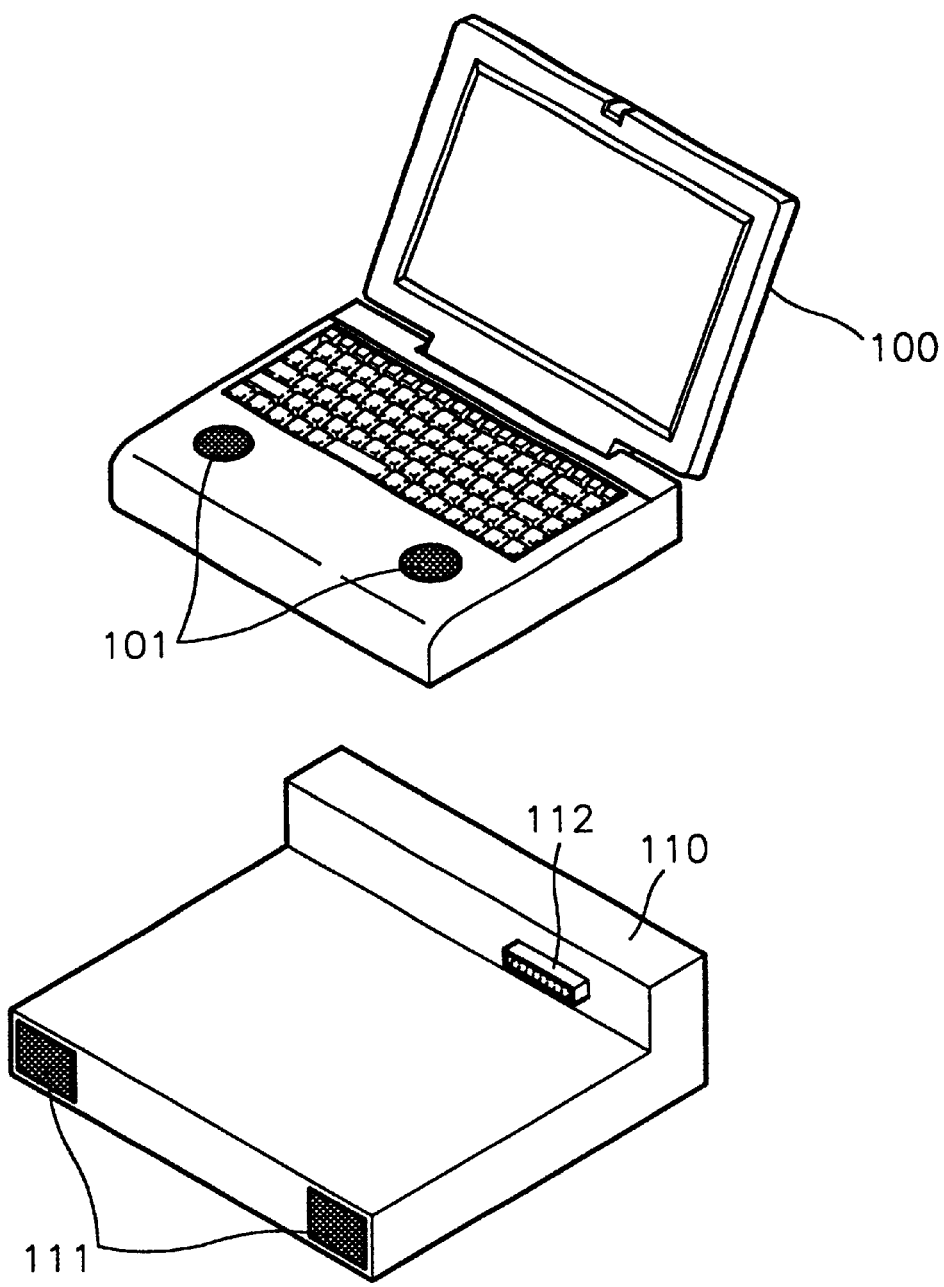
FIG. 1 shows the general structures of a laptop computer and a docking station.

FIG. 1 shows the structures of a laptop computer 100 and a docking station 110. Here, the description will be limited to the structure relating to the output of an audio signal from the laptop computer, omitting other functions of the laptop computer 100 and the docking system 110. The laptop computer 100 has system speakers 101 for outputting an audio signal generated in the laptop computer 100. The system speakers 101 are designed to be suitable for outputting a high frequency band component. The docking station 110 has speakers 111 capable of outputting a higher volume than the system speakers 101, and which output the audio signal from the laptop computer 100 when the docking station 110 is coupled with the laptop computer 100. When the laptop computer 100 is installed on the docking station 110 as shown in FIG. 2 and first connector 112 of the docking station 110 is coupled with second connector (not shown) of the laptop computer 100, the audio signal is output from the laptop computer 100 to the docking station 110 via the coupled connectors.

Figure 2:
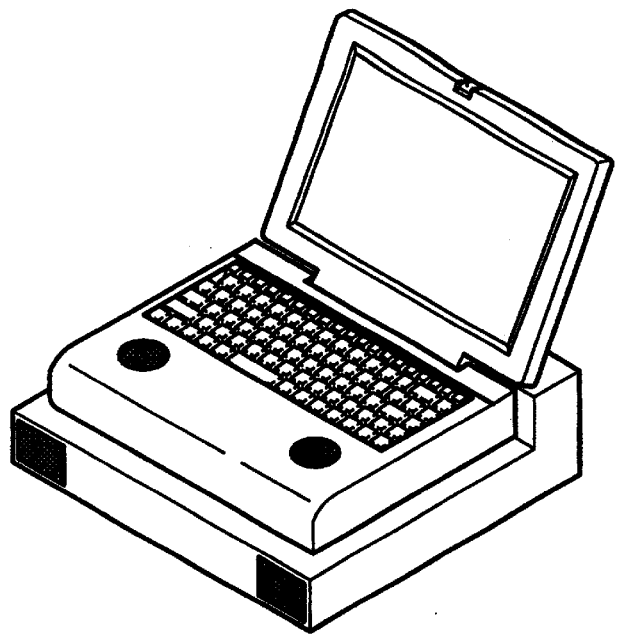
FIG. 2 shows a coupling structure of the laptop computer and the docking station shown in FIG. 1.
Figure 3:
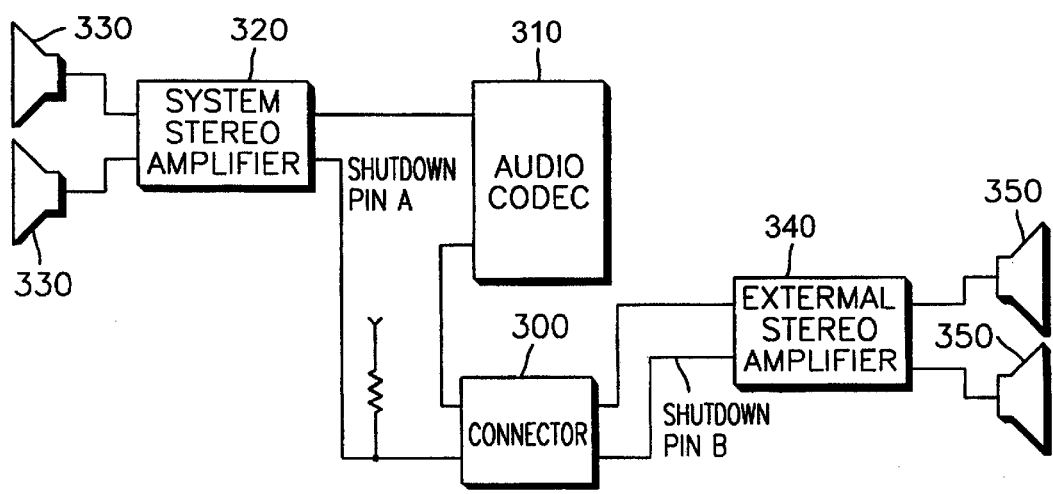
FIG. 3 is a circuit diagram of an audio signal output circuit when the laptop computer is coupled with the docking station as shown in FIG. 2.

FIG. 3 is a circuit diagram illustrating the output of an audio signal when the laptop computer 100 and the docking station 110 are coupled as shown in FIG. 2. The audio signal output circuit shown in FIG. 3 includes a connector 300 for coupling the laptop computer 100 with the docking station 110, an audio coder/decoder (CODE) 310, a system stereo amplifier 320, system speakers 330, an external stereo amplifier 340 and external speakers 350. The coupling connector 300, which includes the first connector of the laptop computer 100 and the second connector 112 of the docking station 110, affects shutdown pins A and B relating to enabling or disabling of the system stereo amplifier 320, and the external stereo amplifier 340, respectively. The system stereo amplifier 320 is disabled by the shutdown pin A when the laptop computer 110 is coupled with the docking station 110. Meanwhile, the external stereo amplifier 340 is enabled by the shutdown pin B controlling the operation of the external stereo amplifier 340 connected to the external speakers 350 of the docking station 110. The audio CODEC 310 encodes or decodes the audio signal generated in the laptop computer 110. The audio CODEC 310 is connected to the system stereo amplifier 320 of the laptop computer 100 and also to the external stereo amplifier 340 of the docking station 110 through the coupling connector 300. The system stereo amplifier 320 included in the laptop computer 100 converts the audio signal decoded by the audio CODEC 310 into a stereophonic sound and outputs the stereophonic sound to the system speakers 330 of the laptop computer 100. The external stereo amplifier 340 and the external speakers 350 of the docking station 110 have substantially the same functions as the system stereo amplifier 320 and system speakers 330 of the laptop computer 100. However, the external stereo amplifier 340 and the external speakers 350 are designed to be more suitable for outputting a low frequency band audio signal while the system stereo amplifier 320 and the system speakers 330 are designed to be more suitable for outputting a high frequency band audio signal. Also, because the external speakers 350 are larger in size than the system speakers 330, sound-output capacity of the external speakers 350 is also larger than that of the system speakers 330.

Hereinafter, the operation of the audio signal output circuit of FIG. 3 will be described. While the laptop computer 100 is separated from the docking station 110, the shutdown pin A of the system stereo amplifier 320 becomes an active high and the system stereo amplifier 320 begins to operate. Here, the audio signal generated from the laptop computer 100 is output to the system speakers 330 via the system stereo amplifier 320. Conversely, when the laptop computer 100 is coupled with the docking station 110 as shown in FIG. 2, the external stereo amplifier 340 operates and the system stereo amplifier 320 is disabled, so that the audio signal generated in the laptop computer 100 is output to the external speakers 350 via the external stereo amplifier 340. In general, the performance of the external stereo amplifier 340 and external speaker 350 of the docking station 110 is better than that of the system stereo amplifier 320 and system speaker 330 of the laptop computer 100. Thus, the external speaker 350 of the docking station 110 is used when the laptop computer 100 is coupled with the docking station 110.

Figure 4:
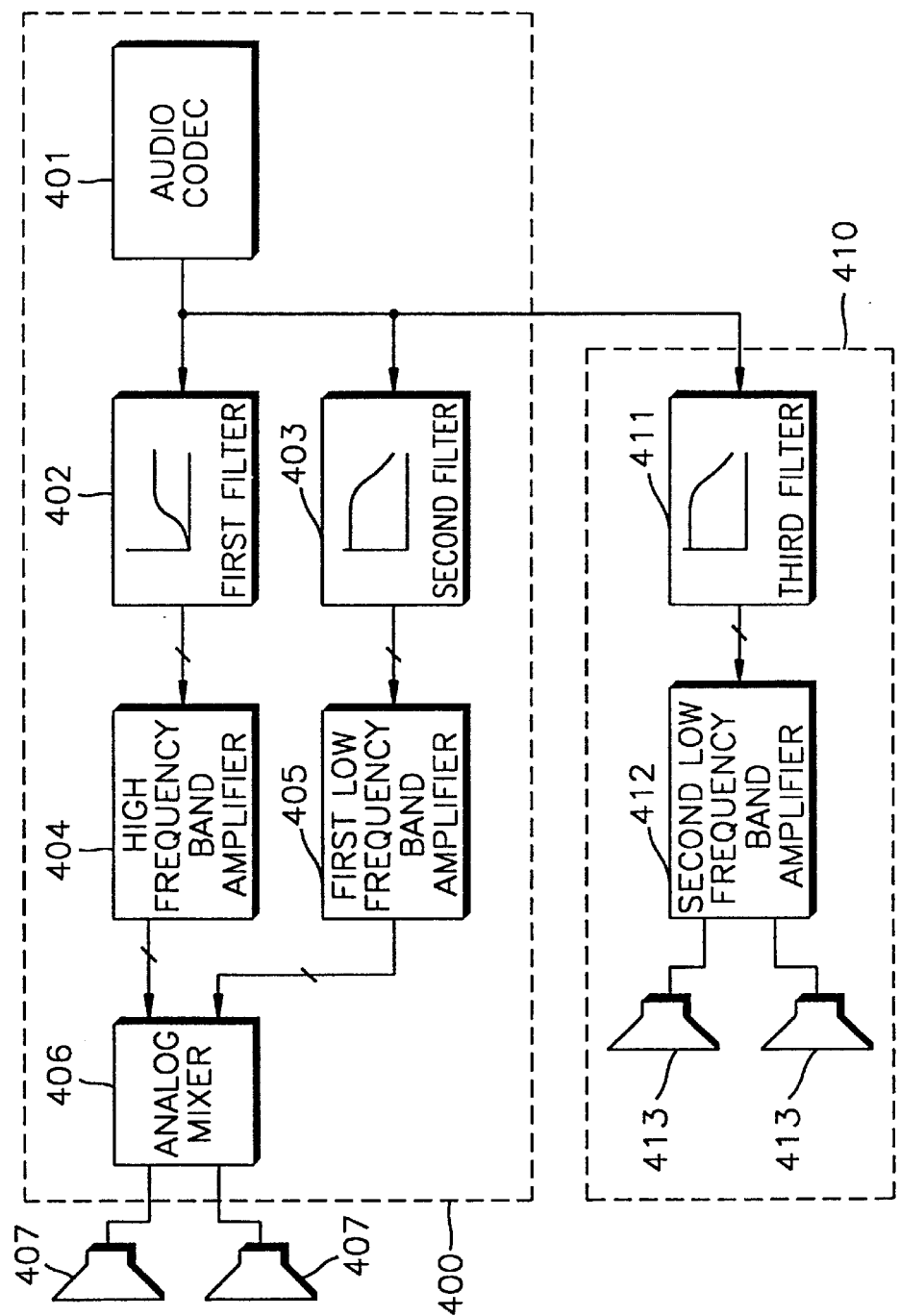
FIG. 4 is a circuit diagram of an apparatus for outputting an audio signal according to the present invention.

As shown in FIG. 4, an apparatus for outputting audio signals according to the present invention includes a laptop computer 400 and a docking station 410. The laptop computer 400 includes an audio coder/decoder (CODEC) 401, first filter 402, second filter 403, a high frequency band amplifier 404, first low frequency band amplifier 405, an analog mixer 406 and system speakers 407, which form the structure for processing the audio signals. The audio CODEC 401 encodes or decodes an audio signal generated in the laptop computer 400. The first filter 402 passes only a high frequency band component of the signal from the audio CODEC 401. The second filter 403 passes only a low frequency band component of the signal from the audio CODEC 401. The high frequency band amplifier 404 amplifies the audio signal output from the first filter 402, and the first low frequency band amplifier 405 amplifies the audio signal output from the second filter 403. The analog mixer 406 mixes the high and low frequency band components respectively output from the high frequency band amplifier 404 and the first low frequency band amplifier 405, and outputs the mixed simal to the system speakers 407.

The docking station 410 processes the audio signal output from the laptop computer 400 while being coupled with the laptop computer 400, and outputs the result to the speakers installed therein. The docking station 410 includes third filter 411, second low frequency band amplifier 412 and additional speakers 413, which form the structure for processing the audio signal. The third filter 411 passes only a low frequency band component of the audio signal output from the audio CODEC 401 of the laptop computer 400, and the second low frequency band amplifier 412 amplifies the audio signal output from the third filter 411, and outputs the amplified signal to the speakers 413. The additional speakers 413 of the docking station 410 are larger than the system speakers 407 of the laptop computer 400, so that it outputs a more powerful audio signal than the system speakers 407 of the laptop computer 410. Also, the additional speakers 413 of the docking station 410 are designed to be more suitable for outputting a low frequency band component.

While the laptop computer 400 is separated from the docking station 410, the audio signal output from the audio CODEC 401 is output to the system speaker 407 via the described circuit for outputting the audio signal of the laptop computer 400. That is, when the laptop computer 400 is not coupled with the docking station 410, a shutdown pin (not shown) controlling enabling or disabling of the first low frequency band amplifier 405 of the laptop computer 400 assumes an active high state, thereby enabling the first low frequency band amplifier 405. Conversely, when the laptop computer 400 is coupled with the docking station 410, the shutdown pin of the first low frequency band amplifier 405 assumes a low state, thereby disabling the first low frequency band amplifier 405, and the signal output from the audio CODEC 401 of the laptop computer 400 is input to the first filter 402 of the laptop computer 400 and the third filter 411 of the docking station 410, so that a high frequency band component is output to the speakers 407 of the laptop computer 400 while a low frequency band component is output to the speakers 413 of the docking station 410.

Hereinafter, the operation of the apparatus for outputting the audio signal according to the present invention will be described.

First, while the laptop computer 400 is separated from the docking station 410, the shutdown pin (not shown) controlling enabling/disabling of the first low frequency band amplifier 405 assumes an active high state, thereby enabling the first low frequency band amplifier 405. Thus, the audio signal output from the audio CODEC 401 is divided into high and low frequency band components by the first and second filters 402 and 403, and then amplified by the high frequency band amplifier 404 and the first low frequency band amplifier 405. The amplified high and low frequency band components output from the high frequency band amplifier 404 and the first low frequency band amplifier 405 are mixed by the analog mixer 406, and then the mixed audio signal is output to the system speakers 407.

Conversely, when the laptop computer 400 is coupled with the docking station 410, that is, the connector (not shown) of the docking station 410 is connected with the connector (not shown) of the laptop computer 400, the first low frequency band amplifier 405 becomes disabled by the shutdown pin (not shown) for controlling enabling/disabling of the first low frequency band amplifier 405 of the laptop computer 400. However, the second low frequency band amplifier 412 of the docking station 410 is selected and enabled. The audio signal output from the audio CODEC 401 is input to the first filter 402 of the laptop computer 400 and the third filter 411 of the docking station 410. The high frequency band component passed through the first filter 402 and the high frequency band amplifier 404 is output to the system speakers 407 of the laptop computer 400, and the low frequency band component passed through the third filter 411 and the second low frequency band amplifier 412 is output to the additional speakers 413 of the docking station 410. In general, the system speakers 407 of the laptop computer 400 are more suitable for a high frequency band component while the additional speakers 413 of the docking station 410 are more suitable for a low frequency band component. Thus, a high quality audio signal can be output using the frequency characteristics of the speakers according to the present invention, in which the speakers of the laptop computer and the docking station are appropriately used based on the frequency band characteristics of the audio signal generated in the laptop computer.

In another preferred embodiment, the laptop computer 400 and the docking station 410 may have more than two amplifiers and filters. The audio signal may be divided into a high frequency band component, a middle frequency band component and a low frequency band component by three different filters. Each filtered audio signal is amplified by three corresponding amplifiers in laptop computer 400 or the docking station 410. If the user wants to hear the high frequency band component signal in the laptop computer 400 and to hear the middle and low frequency band component signals in the docking station 410, only the high frequency band filter and high frequency band amplifier 404 are selected and enabled in the laptop computer 400, and the middle and low frequency band filters and middle and low frequency band amplifiers are selected and enabled in the docking station 410.

Figure 5:
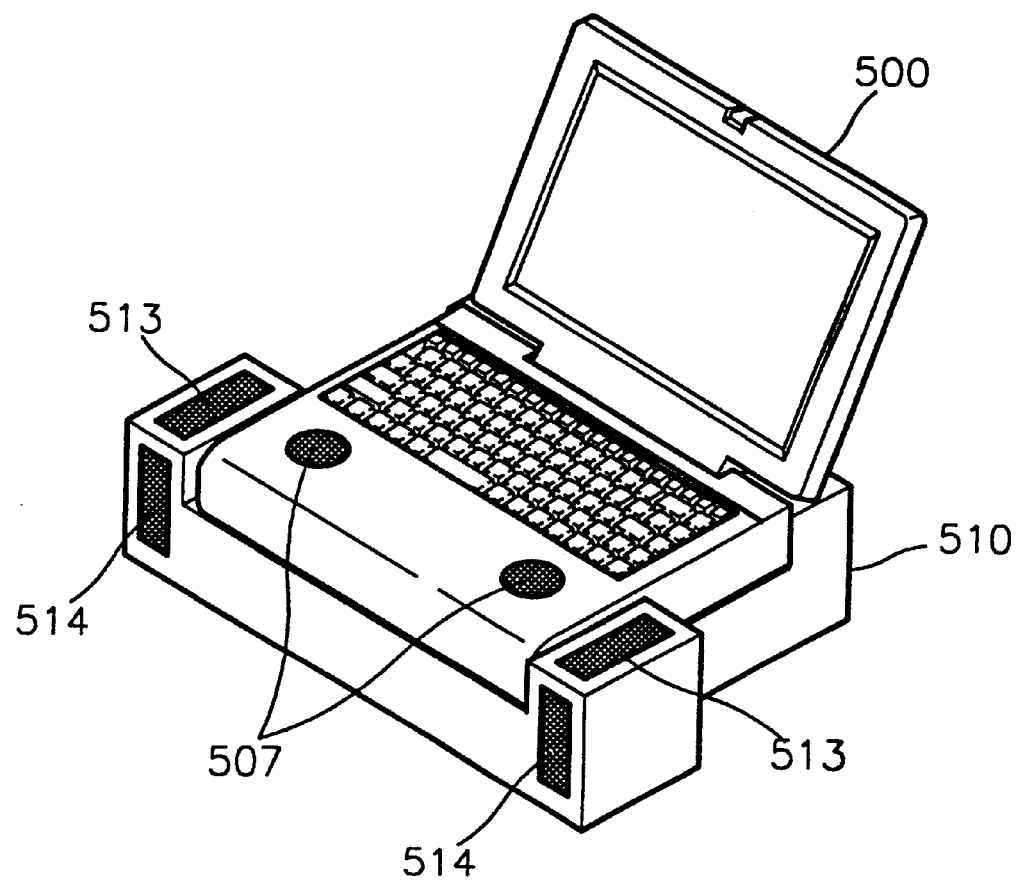
FIG. 5 shows the coupling structure of the laptop computer and the docking station according to the present invention.

FIG. 5 shows the coupling state of a laptop computer 500 and a docking station 510 according to another embodiment of the present invention. Here, the docking station 510 has a first speaker 513 which is aligned in the same direction as that of a system speaker 507 of the laptop computer 500 and a second speaker 514 which is directed to the front. In general, quality of the output audio signal is improved if speakers are placed in the same direction.

According to the principles of this invention, when the laptop computer is coupled with the docking station, the audio signal generated in the laptop computer is divided into high and low frequency band components, and each divided signal is output to different speakers according to the frequency characteristics of the divided signals. Thus, efficiency in use of the speakers and sound quality are improved. While this invention has been described in connection with what is presently considered to be the most practical and the disclosed embodiments, it is to be understood that the invention is not limited to the disclosed embodiment, but, on the contrary, is intended to cover various modifications and equivalent arrangements included within the sprit and scope of the amended claims.

What is claimed is:

1. An apparatus for selectively outputting an audio signal to at least one first speaker in a main device and to at least one second speaker in an external device, said apparatus comprising:

first audio circuit means in said main device for processing an audio input to produce a first audio output regardless of whether said main device is coupled to said external device;

second audio circuit means in said main device for processing said audio input to produce a second audio output only when said main device is not coupled to said external device; and third audio circuit means in said external device for processing said audio input to produce a third audio output only when said main device is coupled to said external device;

wherein said main device further comprises mixer means connected to said first and second audio circuit means, respectively, for mixing said first and second audio outputs of said first and second audio circuit means, and for providing a mixer output to said at least one first speaker.

2. The apparatus of claim 1, wherein said at least one first speaker in said main device receives said first and second audio outputs from said first and second audio circuit means, respectively, and said at least one second speaker in said external device receives said third audio output from said third audio circuit means.

3. The apparatus of claim 1, wherein each of said first, second and third audio circuit means comprises a filter and an amplifier.

4. The apparatus of claim 3, wherein said filter in said first audio circuit means is a high pass filter, and said filters in said second and third audio circuit means are low pass filters.

5. The apparatus of claim 1, wherein said at least one speaker in said main device and said at least one speaker in said external device are positioned in a common plane when said main device is coupled to said external device.

6. An apparatus for selectively outputting an audio signal to at least one first speaker in a main device and to at least one second speaker in an external device said apparatus comprising:

first audio circuit means in said main device for processing an audio input to produce a first audio output regardless of whether said main device is coupled to said external device;

second audio circuit means in said main device for processing said audio input to produce a second audio output only when said main device is not coupled to said external device; and third audio circuit means in said external device for processing said audio input to produce a third audio output only when said main device is coupled to said external device;

wherein said main device is a laptop computer and said external device is a docking station.

7. The apparatus of claim 6, wherein said at least one speaker in said main device and said at least one speaker in said external device are positioned in a common plane when said main device is coupled to said external device.

8. The apparatus of claim 7, wherein said external device further comprises at least one additional speaker positioned in a plane perpendicular to said common plane when said main device is coupled to said external device.

9. The apparatus of claim 6, wherein said main device further comprises mixer means connected to said first and second audio circuit means, respectively, for mixing said first and second audio outputs of said first and second audio circuit means, and for providing a mixer output to said at least one first speaker.

10. An apparatus for selectively outputting an audio signal to at least one first speaker in a main device and to at least one second speaker in an external device, said apparatus comprising:
   first audio circuit means in said main device for processing an audio input to produce a first audio output regardless of whether said main device is coupled to said external device;
   second audio circuit means in said main device for processing said audio input to produce a second audio output only when said main device is not coupled to said external device; and
   third audio circuit means in said external device for processing said audio input to produce a third audio output only when said main device is coupled to said external device;
   wherein said at least one speaker in said main device and said at least one speaker in said external device are positioned in a common plane when said main device is coupled to said external device; and
   wherein said external device further comprises at least one additional speaker positioned in a plane perpendicular to said common plane when said main device is coupled to said external device.

11. A method for selectively outputting an audio signal to at least one first speaker in a main device and to at least one second speaker in an external device, said method comprising:
   (a) processing an audio input to produce a first audio output regardless of whether said main device is coupled to said external device;
   (b) processing said audio input to produce a second audio output only when said main device is not coupled to said external device; and
   (c) processing said audio input to produce a third audio output only when said main device is coupled to said external device;
   wherein step (a) comprises high pass filtering, and steps (b) and (c) comprise low pass filtering;
   said method further comprising the step of mixing said first and second audio outputs to obtain a mixer output for provision to said at least one first speaker.

12. The method of claim 11, further comprising the steps of:
   receiving, at said at least one first speaker in said main device, said first and second audio outputs; and
   receiving, at said at least one second speaker in said external device, said third audio output.

13. The method of claim 12, wherein each of said processing steps (a), (b) and (c) further comprises amplifying.

14. A method for selectively outputting an audio signal to at least one first speaker in a main device and to at least one second speaker in an external device said method comprising:
   (a) processing an audio input to produce a first audio output regardless of whether said main device is coupled to said external device;
   (b) processing said audio input to produce a second audio output only when said main device is not coupled to said external device; and
   (c) processing said audio input to produce a third audio output only when said main device is coupled to said external device;
   wherein said main device is a laptop computer and said external device is a docking station.

15. The method of claim 14, wherein step (a) comprises high pass filtering, and steps (b) and (c) comprise low pass filtering.

* * * * *